United States Patent [19]

Bieri

[11] Patent Number: 6,004,203

[45] Date of Patent: Dec. 21, 1999

[54] DEVICE FOR CIRCULATING AN AIR FLOW FOR PASSENGER COMPARTMENT OF A VEHICLE

[75] Inventor: Frédéric Bieri, Bucheres, France

[73] Assignee: Plastic Omnium Auto Interierur, Lyons, France

[21] Appl. No.: 09/070,282

[22] Filed: Apr. 30, 1998

[30] Foreign Application Priority Data

Apr. 30, 1997 [FR] France .................................. 97 05605

[51] Int. Cl.[6] .................................................. B60H 1/34
[52] U.S. Cl. .......................................................... 454/152
[58] Field of Search .................................. 454/152, 120, 454/137, 284, 296, 143, 162, 302

[56] References Cited

U.S. PATENT DOCUMENTS

| 2,992,604 | 7/1961 | Trotman et al. ........................ 454/152 |
| 3,602,126 | 8/1971 | Breitschwerdt . |
| 4,182,227 | 1/1980 | Roy . |
| 4,981,324 | 1/1991 | Law ........................................ 297/180 |
| 4,997,230 | 3/1991 | Spitalnick .............................. 297/180 |
| 5,524,923 | 6/1996 | Henseler ............................. 280/728 B |
| 5,620,366 | 4/1997 | Munzel et al. .......................... 454/152 |
| 5,692,952 | 12/1997 | Chih-hung .............................. 454/120 |

Primary Examiner—Harold Joyce
Assistant Examiner—Derek S. Boles
Attorney, Agent, or Firm—Harrison & Egbert

[57] ABSTRACT

A device for circulating an air flow in the passenger compartment of a vehicle including a supply zone for the air, a panel having an emission zone and a recession in the opening of the supply zone. The panel fitted to allow an open circulation of the flow at the same time in all directions in space. The recess is below the emission zone and fitted to allow the distribution of the flow simultaneously over the entire emission zone.

9 Claims, 3 Drawing Sheets

DEVICE FOR CIRCULATING AN AIR FLOW
FOR PASSENGER COMPARTMENT OF A
VEHICLE

TECHNICAL FIELD

The invention presented here involves a device for circulating an air flow for the passenger compartment of a vehicle, particularly of an automobile.

However, though it is most particularly planned for applications of this sort, it can also be used in any other type of nautical, air, or land vehicle.

BACKGROUND ART

In the automotive vehicles currently known, air circulation is generally carried out by devices opening at the level of the casing components such as, for example, instrument panels, door panels, or others. These devices consist in particular of different conduits which allow the transportation of an air flow to an opening where the aforementioned air flow is projected into the passenger compartment through a ventilation grill, which may be adjustable, appearing on the surface of these components.

They allow, simultaneously and/or selectively, a projection of the flow towards the driver, the passengers, and/or the glass surfaces close to the casing components.

A first disadvantage of these devices consists in the fact that the air flow(s) emitted follow a precise direction and thus give the vehicle passengers a sensation of an air current which, although it may be sometimes desired, is often unpleasant and the source of discomfort when only a light circulation is desired. Moreover, these currents of air do not promote the establishment of an atmosphere of uniform air inside the passenger compartment.

Another disadvantage of these devices is that they are not very aesthetic and detract from the outside appearance of the casing components. In addition, they often generate noise.

Moreover, it can be noted that they are difficult to adjust. In fact, as an example, when a driver is alone in the vehicle, if a side ventilation grill is located on the front passenger side, it is not easy for the driver to reach it; he thus has difficulty in controlling the air flow emitted.

The goal of the invention presented here is to propose a device for circulating an air flow for the passenger compartment of a vehicle which compensates for the aforementioned disadvantages and promotes the circulation of the air flow in order, in particular, to reduce the feeling of the air current.

Another goal of the invention presented here is to propose a device for the circulation of an air flow for the passenger compartment of a vehicle which promotes a dispersion of the air in the space.

Another goal of the invention presented here is to propose a device for the circulation of an air flow for the passenger compartment of a vehicle which makes it possible to improve the aesthetic of the casing component to which it is applied and to integrate it with discretion into the aforementioned passenger compartment.

Another goal of the invention presented here is to propose a device for circulating an air flow for the passenger compartment of the vehicle which makes it possible to reduce the level of noise generated during the emission of the flow.

Another goal of the invention presented here is to propose a device for circulating an air flow for the passenger compartment of the vehicle which is easier to control thanks to, in particular, a centralization and/or a reduction in the number of settings to be made.

An advantage of the invention presented here is to make it possible to establish a uniform atmosphere in the passenger compartment of the vehicle.

Other goals and advantages of the invention presented here appear in the course of the following description which is only given as a guideline and is not intended to limit it.

SUMMARY OF THE INVENTION

The invention presented here involves a device for the circulation of an air flow for the passenger compartment of a vehicle, particularly automotive vehicles, comprising a supply zone for the air, a panel, easily penetrated on a local level, having an emission zone of the aforementioned air flow, fitted to allow an open circulation of the aforementioned flow at the same time in all directions in space, a recess, in the opening of which is the aforementioned supply zone; the recess being planned at least below the aforementioned emission zone and fitted to allow the distribution of the flow simultaneously over the entire emission zone.

BRIEF DESCRIPTION OF THE DRAWINGS

The invention presented here is best understood in reading the following description accompanied by the attached drawings which make up an integral part of it and among which.

DETAILED DESCRIPTION OF THE INVENTION

The invention presented here involves a device for circulating an air flow for the inside passenger compartment of the vehicle, particularly an automotive vehicle.

However, though most particularly planned for applications of this sort, it can also be used in all other types of nautical, air, and/or land vehicles.

Figure 1:
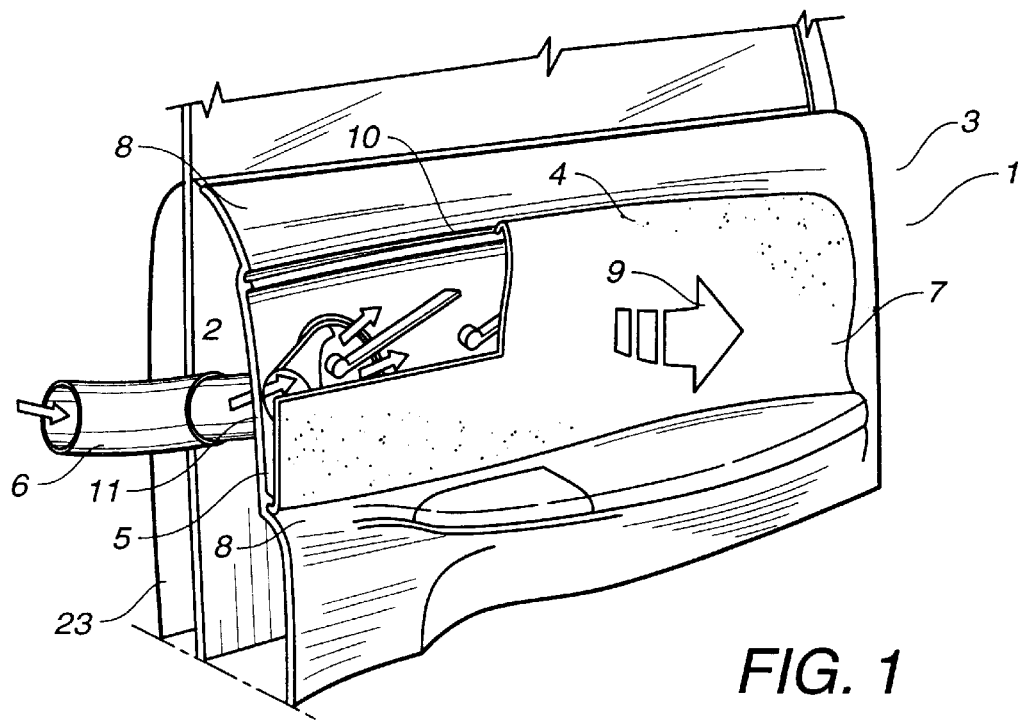
FIG. 1 describes, in a perspective view, a first embodiment example of a circulation device according to the invention, FIG. 2 describes, in a perspective view, a second embodiment example of a circulation device according to the invention, FIG. 3 describes, in a front view, the inside of the device shown in the preceding FIG. 1.
Figure 2:
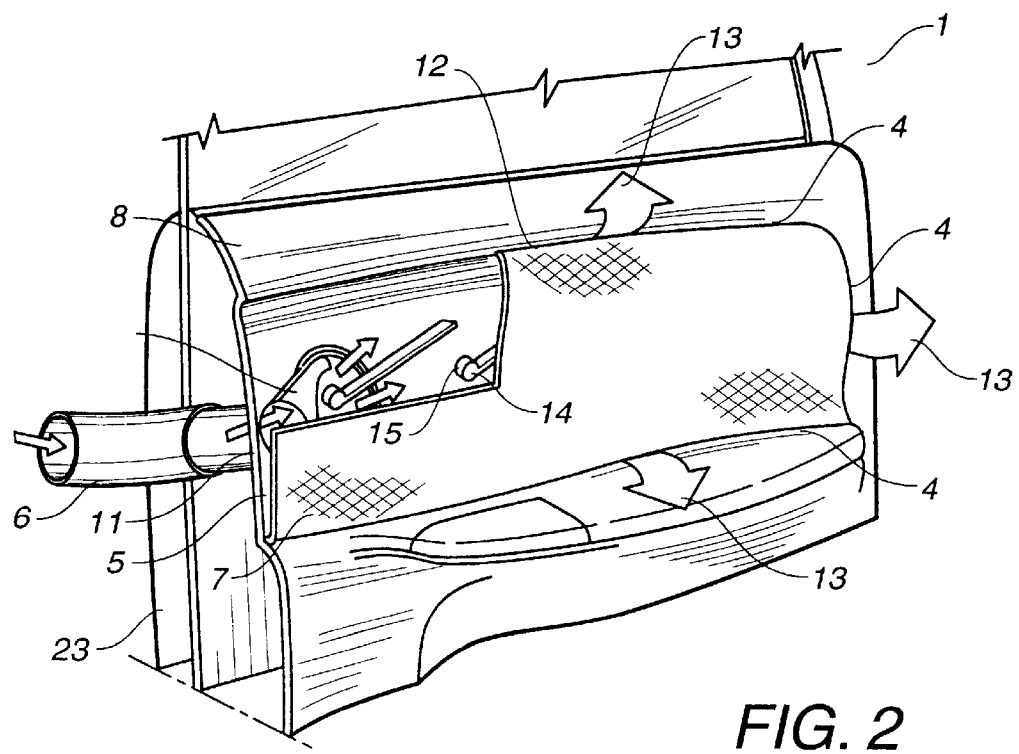

As depicted in FIGS. 1 and 2 as well as 8 and 10, the device 1 for circulation of an air flow for the passenger compartment of the vehicle includes of at least one air supply inlet 2 and a panel 3, easily penetrated on a local level, having an emission zone 4 of the aforementioned air flow. The aforementioned emission zone 4 is fitted to allow an open circulation of the aforementioned flow simultaneously in all directions in space. By "open" it is understood that the emission of the flow of air is not directed in a given direction, corresponding, namely to the direction of the flow supply.

Moreover, the aforementioned device 1 consists of a recess 5 in the opening of which is the aforementioned supply inlet 2. The aforementioned recess 5, is located behind the aforementioned emission zone 4, is arranged to allow the distribution of the flow simultaneously over the entire aforementioned emission zone 4.

Device 1 according to the invention thus promotes the circulation, particularly by diminishing the feeling of the air current, and makes easier the distribution of the air flow in the passenger compartment of the equipped vehicle.

Figure 8:
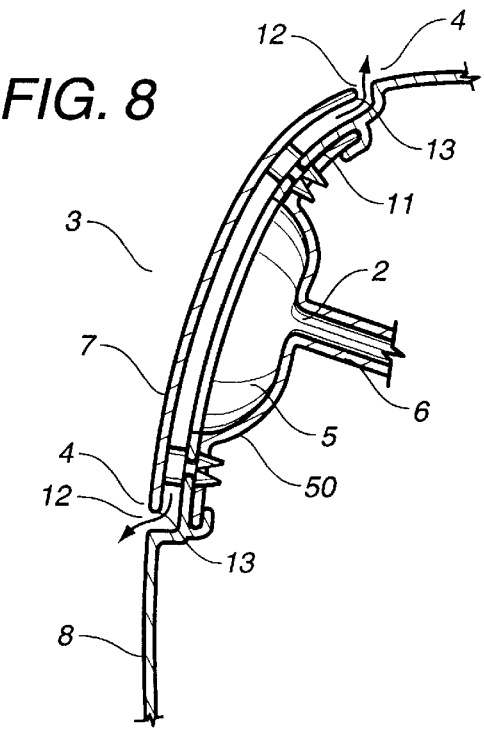
Figure 9:
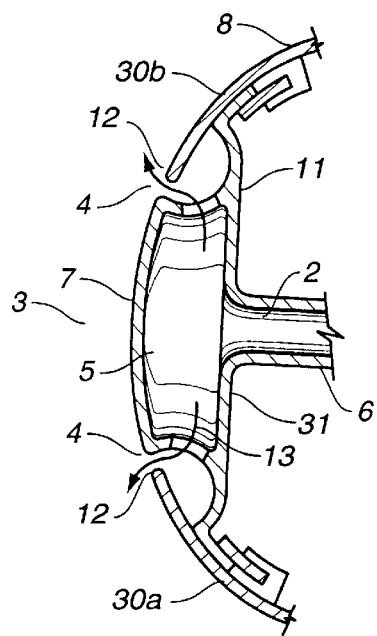
Figure 10:
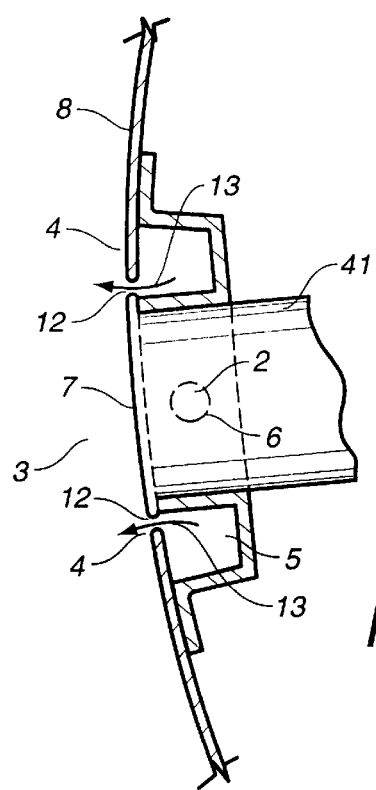

The device is used on the doors of the vehicle, as depicted in FIGS. 1 and 2, on its instrument panel, as shown in FIGS. 8 to 10, and/or others.

The air supplied at the level of the aforementioned supply inlet 2 comes, for example, by the intermediate action of the different conduits 6, from a device for ventilation, heating, and/or air conditioning, not shown, located behind the instrument panel of the aforementioned vehicle.

In order to reduce the number of adjustment settings to be made, the aforementioned air supplied at the level of the supply inlet 2 can have, if necessary, a flow and/or a temperature pre-adjusted upstream, in particular, at the level of the aforementioned device for ventilation, heating, and/or air conditioning.

According to the different embodiments shown, the aforementioned panel 3 consists of an insert 7 and a frame 8 surrounding, at least partially, the aforementioned insert 7. As shown in the following, the aforementioned emission zone is defined by the aforementioned insert 7, the outline of the aforementioned insert 7 or a part of the aforementioned insert 7.

If reference is made more specifically to FIG. 1, it is noted that the aforementioned insert 7 is of a porous material. Moreover, it is secured in a manner so as to be impermeable to the frame 8 along their interface. It thus allows a circulation of air over the entire surface of the aforementioned insert 7, the air passing across the aforementioned porous material, as shown by the arrow indicated 9.

In the case of the Figure, the recess 5 is located behind the assembly of the aforementioned insert 7. This insert consists, notably, of a porous support covered by a textile material.

Figure 3:
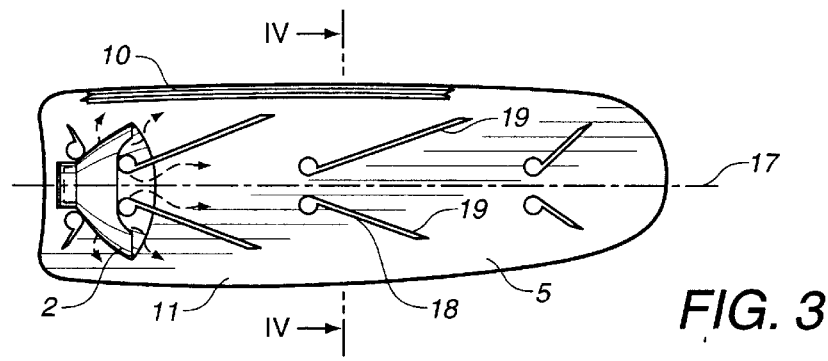
Figure 4:
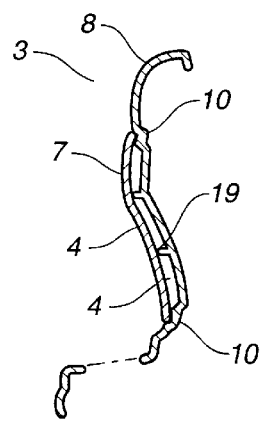
FIG. 4 is a sectional view made along the line IV—IV shown in FIG. 3, FIG. 5 describes, in a front view, the inside of the device shown in FIG. 2.

As shown in FIGS. 3 and 4, in order to attach the insert 7 and the frame 8 to each other, the aforementioned panel 3 has, if necessary, at the aforementioned frame 8, a groove 10 in which the aforementioned insert 7 is fitted to be secured at its periphery, in particular by a silicone seal, a double-sided adhesive tape, a hot-melt glue or others.

According to another embodiment mode, the aforementioned insert 7 and the aforementioned frame 8 are secured in the aforementioned groove 10 by using the die-cast slugs in the aforementioned insert 7 and fitted to be locked in the aforementioned groove 10, a foam seal located between the aforementioned insert 7 and the aforementioned frame 8.

According to yet another different embodiment mode, the aforementioned insert 7 can be equipped on its periphery with elastic fastening tabs fitted to cooperate with an airtight profile section located the aforementioned frame 8.

According to the embodiment example shown in FIG. 1, as well as the FIGS. 3 and 4 and those described below, it is to be noted that a very good filtering of the air upstream from the supply inlet 2 will be necessary in order to avoid any problem of fouling of the aforementioned insert 7, which could be replaceable.

If you refer now to the example of the embodiment shown in FIGS. 2, 8 and 9, you will note that the aforementioned insert 7, is formed of an airtight material, is secured, to a wall 11 which makes up the interior wall of the aforementioned recess 5. Moreover, the aforementioned panel 3 has a gap width 12 between the aforementioned frame 8 and the aforementioned insert 7, on the periphery of the insert. The aforementioned panel 3 makes possible a circulation of air over the entire perimeter of the aforementioned insert 7, as shown by the arrows indicated 13.

The aforementioned gap width 12 thus forms a hollow seal between the insert 7 and the frame 8, which allows the passage of an air flow.

In the case of the Figure, the aforementioned insert 7 consists, for example, of a rigid molded plastic panel, possibly covered with a textile material.

Figure 5:
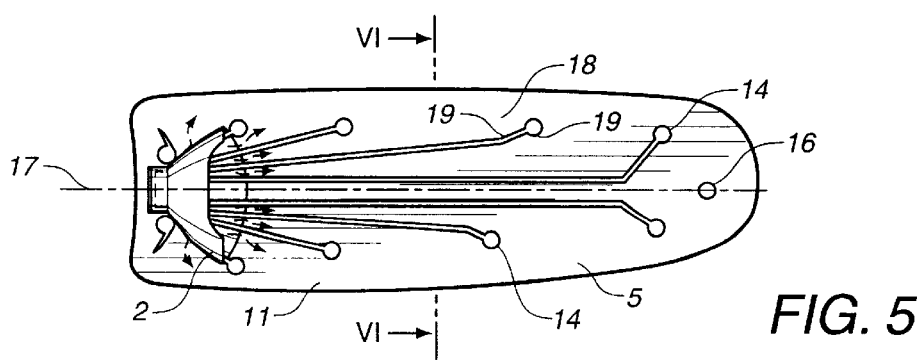

In order to be secured to each other, the aforementioned insert 7 has, tappets 14 fitted to work together, in particular by locking, in the vents 15 formed on the wall 11 which forms the interior wall of the recess 5. As shown in FIG. 5, the centering slugs 16 can also located between the aforementioned insert 7 and the aforementioned wall 11 which makes up the interior wall of the aforementioned recess 5.

According to the embodiment mode shown in FIG. 10, the aforementioned insert 7 and the aforementioned frame 8 also have among them a gap width 12, fitted to define the aforementioned emission zone of the flow 4.

However, contrary to the embodiment modes shown in FIGS. 2, 8 and 9, in which the aforementioned recess 5 is planned under the entire insert 7, in this case, the aforementioned recess 5 consists of a tubular component in the form of a collar 40, below the aforementioned emission zone 4.

According to the embodiment mode, the aforementioned insert 7 is made of a separate piece 41 on its exterior surface, surrounding which the aforementioned tubular component 40. The aforementioned piece 41 is supported, if necessary, by the aforementioned frame 8, with the help of the tubular component 40.

If you refer now at the same time to FIGS. 3 and 5, the aforementioned recess 5 has a longitudinal axis 17 and the aforementioned air supply inlet 2 is planned fitted in order to orient the air introduced into the recess 5 roughly in a favorable direction defined, by the aforementioned longitudinal axis 17.

Moreover, the device 1 according to the invention consists, in addition if necessary, of mechanisms 18 for promoting a uniform distribution of air in the aforementioned recess 5 from the aforementioned supply inlet 2.

Figure 6:
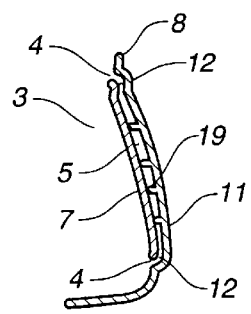
FIG. 6 is a sectional view made according to the line VI—VI shown in FIG. 5.

As also shown in FIGS. 4 and 6, the aforementioned mechanisms 18 for promoting a uniform distribution of air consist of, in particular, the blades 19, postioned in the aforementioned recess 5.

The aforementioned blades 19 are distributed, for example, in pairs, the two components of each pair being located on either side of the aforementioned longitudinal axis 17 and having a slope roughly the same relative to the aforementioned longitudinal axis 17.

According to the different embodiment examples shown, the aforementioned blade pairs 19 are arranged one behind the other along the aforementioned longitudinal axis 17, the angle formed between two blades 19 of a common pair being crescent shaped from one blade pair 19 to the next going from the aforementioned air supply inlet 2.

It is possible to have three pairs of blades 19, the angle formed between two blades 19 of the same pair varying, in particular, from 10° to 120°.

In addition, the aforementioned air supply inlet 2 is located one end of the aforementioned longitudinal axis 17.

Figure 7:
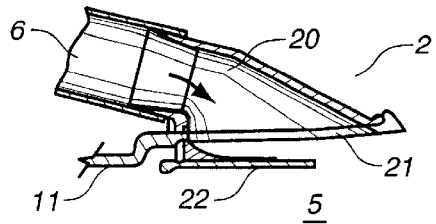
FIG. 7 depicts in detail a view from above according to a transverse plane section, an embodiment example of a component of the circulation device according to the invention, FIG. 8 describes, in a sectional view, a third embodiment example of the circulation device according to the invention, FIG. 9 describes, in a sectional view, a fourth embodiment example of the circulation device according to the invention, FIG. 10 describes, in a sectional view, a fifth embodiment example of the circulation device according to the invention.

As shown in FIG. 7, the aforementioned air supply inlet 2 is made up of, in particular, a duct 20, which opens into the opening 21, formed in the aforementioned wall 11 which makes up the interior wall of the recess 5, and of a circulation screen 22, postioned partially above the forementioned opening 21 in order to distribute the air introduced into the aforementioned recess 5.

This being the case, according to the embodiment modes shown by FIGS. 4, 6 and 8, the aforementioned frame 8 extends at least partially below the aforementioned insert 7 in a manner to define the aforementioned recess 5 and/or to function to support the aforementioned recess 5.

According to this embodiment, the aforementioned frame 8 completely surrounds the aforementioned insert 7.

As shown in FIGS. 4 and 6, the aforementioned frame 8 is, for example, completely extended behind the aforementioned insert 7 and thus defines the interior wall and the side walls of the aforementioned recess 5.

As shown in FIG. 8, the aforementioned frame 8 is only extended partially and the aforementioned device includes of a supplementary component 50, secured to the aforementioned frame 8 below the aforementioned insert 7, defining the bottom of the aforementioned recess 5.

According to a different embodiment mode corresponding to that shown in FIG. 9, the aforementioned frame 8 includes many pieces 30a, 30b, distanced on either side of the aforementioned insert 7. Moreover, the device includes a supplementary hollow component 31 which defines the aforementioned insert 7 as well as the side walls and the bottom of the aforementioned recess 5, the aforementioned component 31 being fitted to join together the aforementioned pieces 30a, 30b which make up the aforementioned frame 8.

According to the embodiment mode, the aforementioned frame 8 surrounds the aforementioned insert 7, if necessary, in a partially exclusive manner.

It is to be noted that the deporous insert suc. 5 can also be formed with a porous insert such as the one shown in FIGS. 1, 3 and 4. In this case, the aforementioned supplementary component 31 is closed, with the exception of the supply inlet 2, and rigid, with the exception of the part corresponding to the insert 7.

As an example, the flow of air emitted by the device 1 according to the invention has a speed of circulation on the order of 1 m/sec. The aforementioned emission zone 4 has a larger area than that of the supply zone 2. These characteristics promote a gentle circulation.

This being the case, the circulation device 1 according to the invention can be placed on the side doors of the equipped vehicle. According to other embodiment modes, it can be postioned at the level of the middle stands, i.e. at the level of the jambs, roughly vertical, located between the front doors and the rear doors.

According to the first embodiment mode mentioned in the previous paragraph, and as more particularly shown in FIGS. 1 and 2, the panel 3 thus includes of the inner-door of the vehicle doors and the conduits 6 which circulate, in particular, in the caisson of the door 23 of the aforementioned vehicle doors.

In the case where the device for ventilation, heating, and/or air conditioning generating the air used is located at the level of the instrument panel, the conduit(s) 6 are connected by pressing to the conduits coming from the aforementioned device for ventilation, heating and/or air conditioning, opening in the vicinity of the hinge joint of the aforementioned vehicle door.

Naturally, other embodiment examples, known to the professional, could have been imagined without going out of the frame of the present application.

I claim:

1. A device for circulating an air flow in a passenger compartment of a vehicle comprising:

a door of the vehicle;

an air supply inlet;

a panel positioned on said door having an emission zone adapted to pass the air flow therethrough simultaneously in all directions, said panel comprising an insert and a frame, said frame at least partially surrounding said inlet, said insert defining said emission zone; and a recess having said air supply insert opening thereto, said recess positioned behind said emission zone, said recess adapted to distribute the air flow throughout said emission zone.

2. The device of claim 1, said insert being formed of a porous material, said insert being impermeably secured to said frame such that the air flow cannot pass through an interface between said insert and said frame.

3. The device of claim 1, said insert being formed of an airtight material, said insert being secured to an interior wall of said recess, said panel having a gap between said frame and said insert along a periphery of said insert, said gap adapted to allow the air flow pass around said periphery of said insert.

4. The device of claim 1, said recess having a longitudinal axis, said air supply inlet adapted to pass the air flow in a direction along said longitudinal axis.

5. The device of claim 4, further comprising:

air distribution means secured within said recess for uniformly distributing air flow in said recess from said air supply inlet.

6. The device of claim 5, said air distribution means comprising a plurality of blades positioned in said recess.

7. The device of claim 6, said plurality of blades being arranged in pairs in said recess, said blades of a respective pair being positioned on opposite sides respectively of said longitudinal axis, each blade of the respective pair having an identical slope with respect to said longitudinal axis, said pairs of blades being arranged one pair behind an adjacent pair along said longitudinal axis, an angle formed between two blades of a pair being crescent shape from said one pair of blades to said adjacent pair and extending from said air supply inlet.

8. The device of claim 1, said frame extending behind said insert in a manner so as to define said recess.

9. The device of claim 1, said frame comprising a plurality of pieces positioned on either side of said insert, the device further comprising:

a supplementary hollow component defining said insert and side walls and an interior wall of said recess, said hollow component being joined to said plurality of pieces.

* * * * *